Dec. 25, 1962        N. C. PRICE        3,070,328
PROPULSION SYSTEM FOR AIRCRAFT
Original Filed Oct. 10, 1955        4 Sheets-Sheet 1
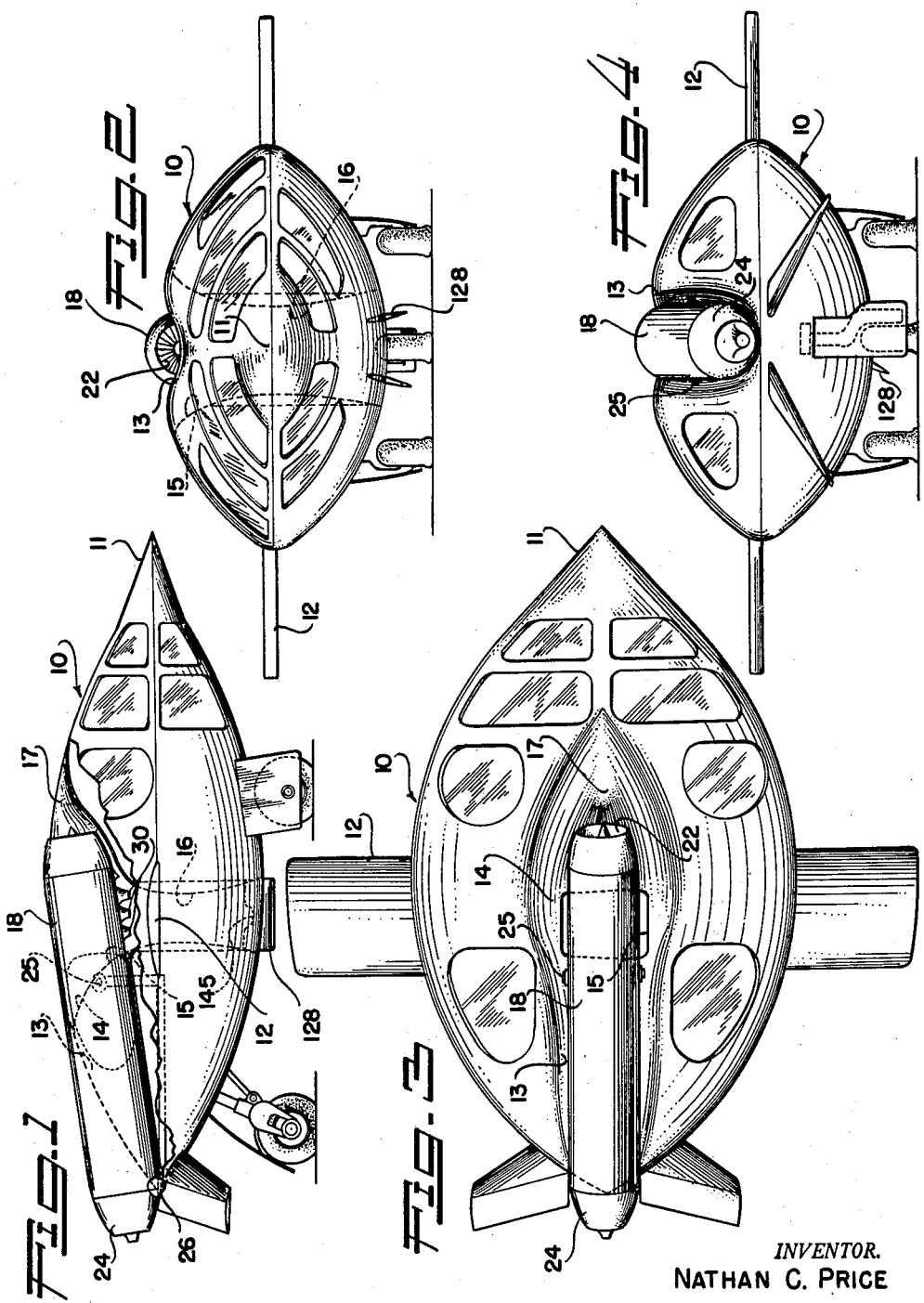
INVENTOR.
NATHAN C. PRICE
BY
*George C. Sullivan*
Agent

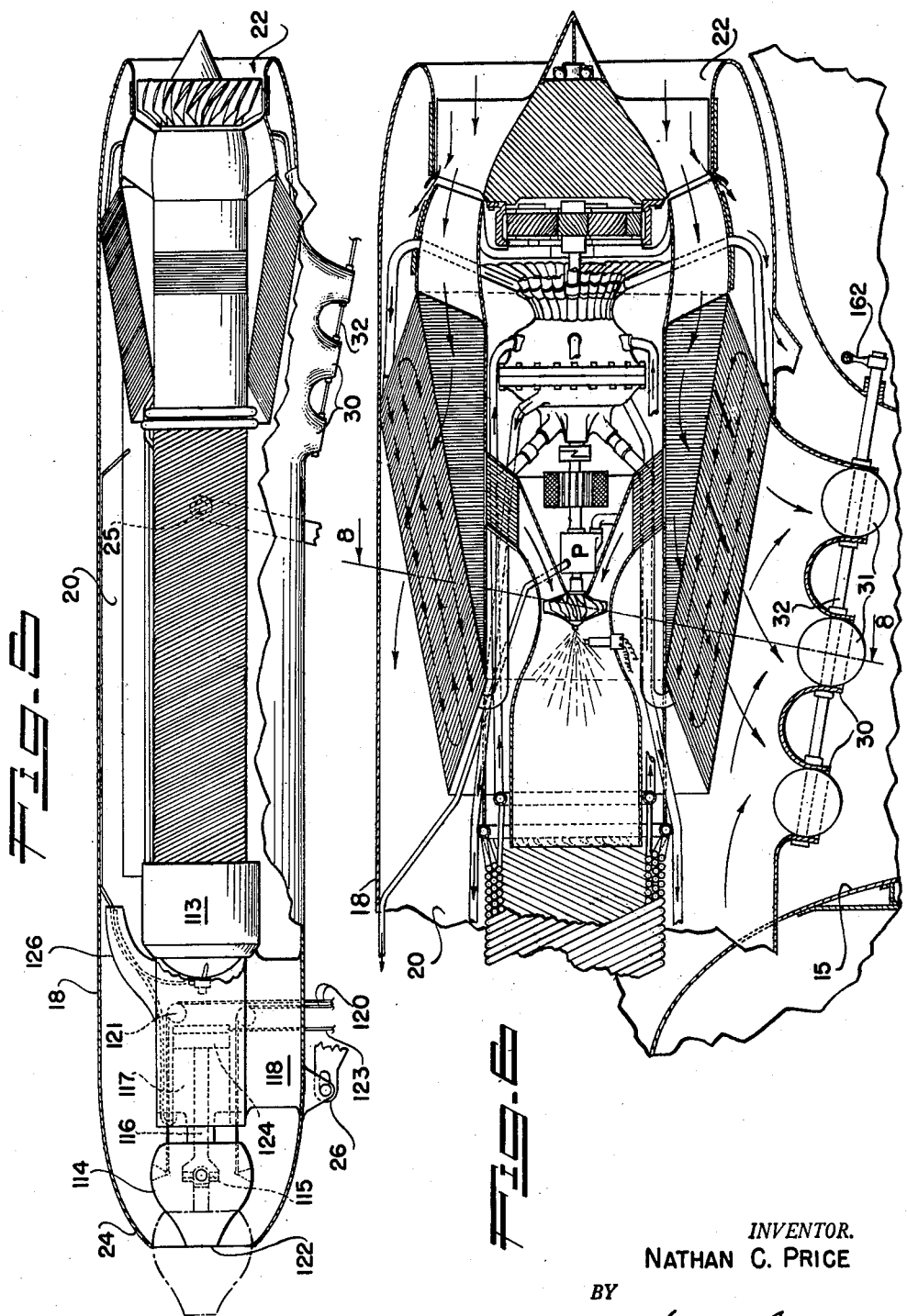

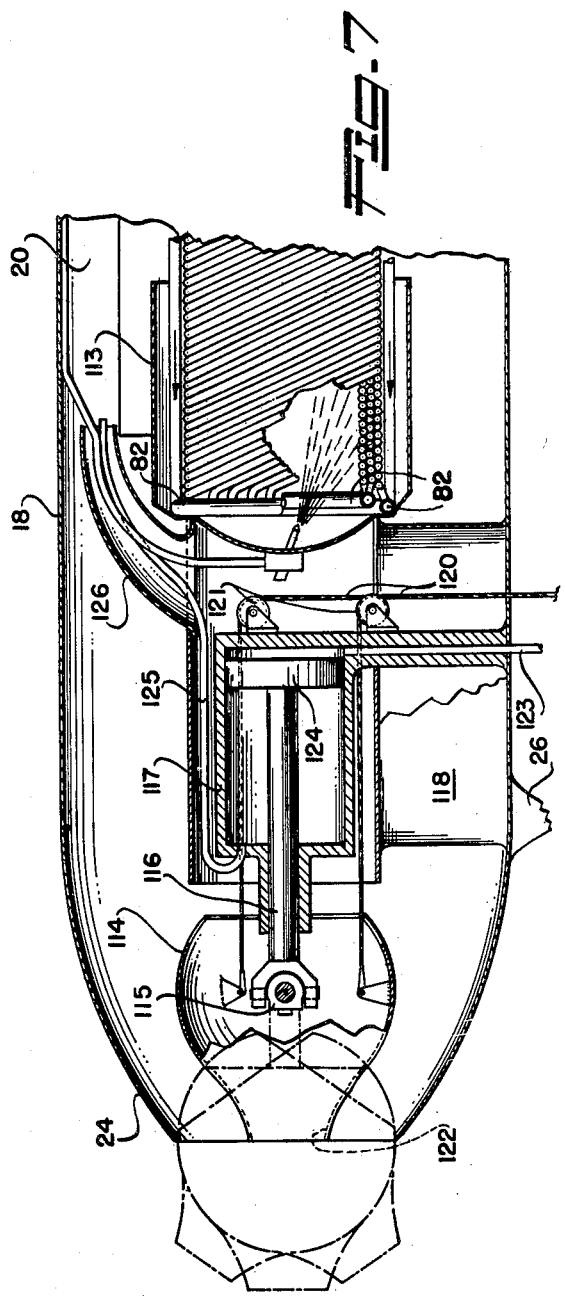

Dec. 25, 1962
N. C. PRICE
3,070,328
PROPULSION SYSTEM FOR AIRCRAFT
Original Filed Oct. 10, 1955
4 Sheets-Sheet 4
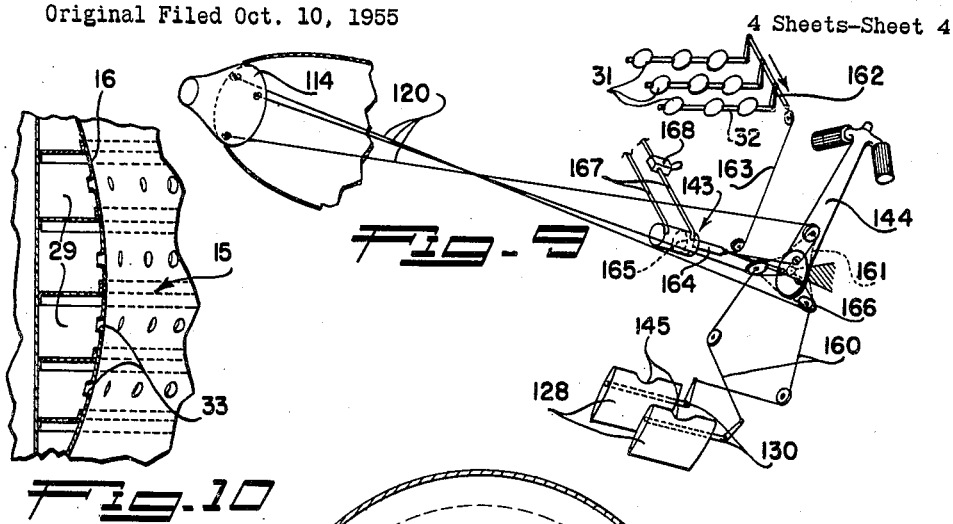
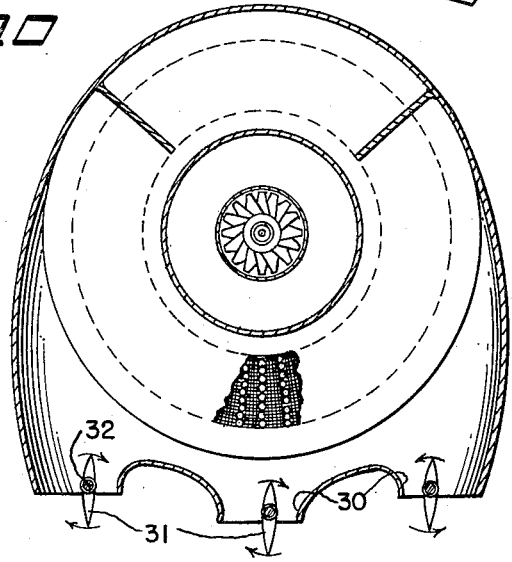
INVENTOR.
NATHAN C. PRICE
BY
George C. Sullivan
Agent

United States Patent Office 3,070,328
Patented Dec. 25, 1962

3,070,328
PROPULSION SYSTEM FOR AIRCRAFT
Nathan C. Price, Mexico City, Mexico
(424¼ Kelton Ave., Westwood, Calif.)
Original application Oct. 10, 1955, Ser. No. 539,606, now Patent No. 2,953,900, dated Sept. 27, 1960. Divided and this application Feb. 12, 1958, Ser. No. 717,292
7 Claims. (Cl. 244—23)

This invention relates to vehicular propulsion and relates, more particularly, to a system or mechanism for the propulsion and directional control of aircraft capable of operation or flight from and to small landing areas.

This is a division of my co-pending application Serial Number 539,606, filed October 10, 1955, and on which United States Letters Patent 2,953,900, entitled "Combined Open-Cycle Closed-Cycle Powerplant for Aircraft," issued on September 27, 1960.

The present invention is concerned, generally, with the propulsion of vehicles, either inhabited or uninhabited, by reactive propulsion engines and by means of which the vehicle may be caused to ascend vertically or at a steep take-off angle, fly or cruise horizontally at high or relatively high translational velocities, and descend or land vertically or at a steep landing angle. During such maneuvers a predetermined amount of boundary layer control effect may be imposed on the aerodynamic upper surface of the aircraft, which is included among the relationships of the invention.

An object of the invention is to provide a vehicle propulsive system characterized by a tubular plenum chamber equipped at its aft end with a directionally controllable nozzle for translational propulsion and with laterally directed nozzles for discharging into a jet pump tube for vertical or substantially vertical ascent and descent of the craft.

It is another object to provide a propulsion system in which the plenum chamber handles a large mass flow of air and is capable of directing the air flow aft through a propulsion nozzle, or downwardly through a vertical jet tube, or through both tube and nozzle concurrently. The air flows internally at an average velocity of approximately 200 ft. per second and finally discharges from the propulsive nozzle at the aft end of the plenum chamber at a jetting velocity of, say, 1350 ft. per second to produce a jet thrust of approximately 1200 lbs. at a weight flow of, say, 28 lbs. per second. It is to be understood that the values just recited are merely typical of a given embodiment and are not intended to be restrictive. For vertical take-off and for landing, and in other cases where vertical thrust is desired, the propulsive nozzle is closed and lateral jet pump nozzles are opened to a vertical jet tube to furnish ample energy for vertical lift.

Another object is to provide an aircraft propulsion system and installation wherein the main powerplant unit is so arranged and related with respect to the airframe and jet pump to substantially promote overall efficiency during vertical ascent and descent, to reduce the noise level and to increase translational flight efficiency of the craft. The plenum chamber casing is nested in a fore and aft depression or channel in the upper surface of the craft to bridge the upwardly facing bell-mouth entrance of the jet pump tube, to have the air inlet of the powerplant face forwardly and slightly upwardly with respect to the fore and aft neutral axis of the aircraft and to have its propulsive nozzles at or beyond the aft extremity of the craft. The powerplant receiving depression is shaped to direct the cone of noise of the air inlet of the powerplant upwardly and forwardly to reduce the apparent sound level and the depression smoothly merges with the bell-mouth of the jet pump tube to reduce the turning losses during induced airflow into the jet pump tube. The nested or partially submerged powerplant blends into the profile of the aircraft to lessen parasitical drag, is readily accessible for inspection and servicing, and is structurally isolated from the aircraft body except for its essential mounts. The directionally controllable propulsive nozzle being at or beyond the rear extremity of the craft provides a large turning moment and may be related to the control surfaces of the aircraft to induce a desirable airflow across these surfaces. The plenum chamber tube has a plurality of jet pump nozzles spouting downwardly into the jet pump tube to induce airflow into this tube for vertical thrust while at the same time creating or promoting a reduced or negative pressure condition at the bell-mouth and adjacent regions of the channel or depression receiving the powerplant, thereby aiding vertical propulsion of the aircraft.

Another object is to provide a propulsion system of this kind wherein the valves controlling the jet pump nozzles and the main propulsive nozzle are conjointly controlled to readily change over from vertical thrust propulsion to horizontal or translational propulsion. The internal passage of the tubular directional control bulb of the main propulsive nozzle remains open at all times to discharge a reactive jet useful for pitch and turn trimming control and the jet pump exit is provided with valves also operable as vanes for bank control, etc. during vertical take-off and landing.

A further objective of the invention is to provide a system of boundary layer air extraction, active during flight, to increase lifting suction on the upper aerodynamic surface of the aircraft.

Other objectives and features of the invention will become apparent from the following detailed description of a typical preferred form and application of the invention illustrated in the accompanying drawings wherein:

FIGURE 1 is a side elevation of an aircraft incorporating the present invention with portions broken away to better illustrate the powerplant installation;

FIGURE 2 is a front view of the craft;

FIGURE 3 is a top or plan view of the craft;

FIGURE 4 is a rear view of the aircraft;

FIGURE 5 is an enlarged longitudinal sectional view of the major portion of the powerplant means with certain elements appearing in side elevation;

FIGURE 6 is an enlarged vertical sectional view of the forward portion of the powerplant means shown in FIGURE 5;

FIGURE 7 is an enlarged longitudinal sectional view of the aft portion of the powerplant means, the broken lines showing the "closed" position of the nozzle bulb;

FIGURE 8 is a substantially vertical sectional view taken as indicated by line 8—8 on FIGURE 6;

FIGURE 9 is a diagrammatic view of the control linkage system; and

FIGURE 10 is an enlarged fragmentary sectional view of the perforated walls of the jet pump tube.

The propulsion system of this invention is, of course, suitable for use for incorporation of crafts of various types and configurations and the particular application of the invention illustrated in the drawings is to be understood as exemplary rather than restrictive. The airframe or body 10 of the craft illustrated may be described as discoid in shape, having its skin or outer surfaces generated by arcs symmetrical about the horizontal axis. In plan view the margins of the fuselage or body 10 curve inwardly and forwardly to a pointed forward end 11, and curve inwardly and aft toward a somewhat less pointed aft end. It will be observed the discoid fuselage or body 10 has a large planform area to possess substantial aerodynamic sustentation in level flight and, therefore, the craft requires wings 12 of only limited dimensions if wings are, in fact, required. The top or upper surface of the body 10 has a central fore and aft channel or elongate depression 13 to receive the powerplant described below. This elongate depression 13 extends from the aft end of the body 10 to a point some distance forwardly of the central vertical axis of the craft. As best seen in FIGURES 3 and 4 of the drawings, the walls of the depression 13 smoothly merge with or join the adjacent surfaces of the body 10 and a substantial region of the depression aft of its forward extremity is flared to form the upper portions of what I will term the bell-mouth 14 of a generally vertical jet pump passage or tube 15. This tube 15 extends downwardly from the depression 13 to the underside of the body 10. As best illustrated in FIGURE 1 and FIGURE 2, the bell-mouth 14 of the jet pump tube 15 converges downwardly to a throat 16 and the walls of the tube gradually diverge downwardly from this throat to the exit of the tube to the end that the tube is substantially venturi shape. Since the bell-mouth 14 is spaced aft of the forward extremity of the elongate depression 13 there is what may be termed a rounded shoulder 17 where the bell-mouth and depression merge near the forward end of the depression.

The powerplant proper has an elongate tubular or hollow casing 18 which may be cylindrical for the major portion of its length. This casing 18 defines or provides the above mentioned plenum chamber 20, carries the air inlet 22 and carries or includes the main propulsive nozzle 24. While the specific powerplant details do not form a part of this invention, the powerplant for creating the propulsive fluid flow through and from casing 18 may be of the type explained and claimed in my copending application Serial Number 539,606, filed October 10, 1955. As illustrated in the drawings, the casing 18 is arranged longitudinally in the above described depression 13 in the top of the craft body 10 to have the air inlet 22 adjacent and slightly aft of the shoulder 17 which is of gentle curvature, and to present the propulsive nozzle 24 at or aft of the pointed rear end of the body. Further, it will be observed the casing 18 may preferably be substantially submerged or contained in the depression 13 to the end that the exterior of its periphery is generally coincident with or tangent to continuations of the upper surface arcs of the body 10, at least throughout a substantial portion of the length of the casing. In FIGURES 1 to 4 inclusive, it will be observed that the central longitudinal axis of the depression 13 and the central fore and aft axis of the casing 18 are pitched or inclined upwardly and forwardly with respect to the central fore and aft axis of the body 10. The purpose and advantages of this disposition of the powerplant casing will be described later. Where the craft is equipped with a single propulsive system the longitudinal axis of the casing 18 preferably intersects the central vertical axis of the body 10 and the fore and aft location of the casing 18 is such that it bridges or extends across the upper end of the jet pump tube 15 and its bell-mouth 14.

While it is contemplated that the powerplant casing 18 may be supported or mounted in any selected or appropriate manner, it will usually be preferred to support the casing in spaced relationship with the walls of the depression 13 to mechanically and thermally isolate the powerplant from the body 10 so far as practically possible and to expedite airflow into the jet pump tube 15 during vertical propulsion phases. Accordingly, I have shown two front engine mounts 25 at diametrically opposite sides of the casing 18 slightly aft of the jet pump tube 15. These mounts 25 are in the nature of pivotal connections supporting the powerplant on an axis normal to the longitudinal axis of the casing 18. The engine mounting means further includes a rear mount 26 at the aft end of the casing 18 adjacent the nozzle 24 and having slotted or lost motion engagement with the body 10 to permit differential thermal expansion and contraction of the casing and body. The mounts 25 and 26 support the casing 18 in the depression 13 in a manner to leave a relatively narrow continuous space between the external surface of the casing and the wall of the depression 13 to allow a free movement of insulating and isolating air therebetween.

The above mentioned propulsive nozzle 24 is in the nature of a rearwardly convergent tubular aft portion or extension of the casing 18. The nozzle 24 serves to discharge or spout a relatively low velocity large mass flow of relatively low temperature heated air and combustion gases from the plenum chamber 20 for the translational propulsion of the vehicle. As will be described below, the nozzle 24 is obstructed when vertical propulsive thrust is desired or required so as to divert the major portions of the propulsive air and gas stream to the jet pump tube 15. The plenum chamber casing 18 is provided with a plurality of jet pump nozzles 30 discharging into the bell-mouth 14 and upper end of the jet pump tube 15. These nozzles 30 are designed to discharge relatively high temperature air and gas streams or jets at high jetting velocities to bring about an efficient jet pump effect and thereby obtain a substantial vertical thrust sufficient to propel the vehicle vertically for vertical or substantially vertical take-off and to sustain the vehicle for controlled slow vertical or substantially vertical landing.

As best illustrated in FIGURES 5, 6 and 8, there is a series of jet pump nozzles 30 on the underside of the casing 18 directed downwardly and slightly to the rear in the downwardly convergent mouth of the jet pump tube 15. The plurality of relatively small jets issuing from the nozzles 30 in the entrance of the jet pump tube greatly increase the air mixing shear area, thereby permitting the employment of a shorter jet pump tube, and jet boundary discontinuities are restrained to small distances. The shorter jet pump tube in turn provides reduced wall friction losses and provides more uniform outlet or jetting conditions. Furthermore, the numerous small nozzles 30 produce efflux noise of relatively high frequency, or in the inaudible range, the former being muffled in the jet pump tube. Such noise as does escape is of high frequency, and therefore highly directional, which prevents noise from being spread over large areas. The angular direction of the nozzles 30 reduces the turning losses of the large volume or flow of ducted compressor air diverted to the jet pump tube 15, as will be apparent. The jet pump nozzles 30 themselves provide a multiplicity of spaced downwardly convergent jetting openings, each of which is equipped with a butterfly valve 31. The valves 31 are carried by shafts 32 to be movable in unison between closed positions where they close off their respective nozzles 30, during translational propulsion of the vehicle, and open positions where they form "throats" in the nozzles 31 to assist in bringing the flow therethrough to the supersonic regime. It can be provided, if desired, that one or more nozzles always remain open, to furnish some jet tube induced flow, for continuous boundary layer extraction during level flight. The valves 31 are airfoil shape in cross section and when their airfoil configurations are axially aligned with the passages through the nozzles 30 they provide the nozzles with effective throats of convergent-divergent configuration to assist in bringing about the supersonic flow just mentioned. Furthermore, the trailing downwardly convergent surfaces of the open butterfly valves present or form thrust surfaces in the jet pump nozzles themselves to impart or assume a vertical lift to the vehicle at the nozzles. The walls of the jet pump tube 15 may be perforated, as shown at 33, for acoustical silencing or damping, the perforations leading to closed cells 29 or chambers in the structure of the tube and, if desired, the rear portion of the plenum chamber 20 or of the nozzle bulb may be perforated in a similar manner for the same purpose. In this connection it may be observed that while the free velocity of the air and gas stream at the throat of the jet pump tube is high, the relative velocity between the air and gas streams is moderate, and the velocity at the exit of the tube is considerably reduced, by intermediate recompression in the jet tube, thus lessening the sound or noise output externally. The detailed operation of the jet pump means of the open circuit including the suction or reduced pressure action at the bellmouth 14 and adjacent regions, will be more fully described in connection with the overall operation of the propulsive system.

In order that the major portion, say 90%, of the powerplant air flow may be diverted for discharge through the jet pump nozzles 30, I provide means for closing or restricting the propulsive nozzle 24. An axially movable tubular bulb 114 is supported for movement between a position forward and clear of the nozzle 24 and a "closed position" where it engages in and restricts the nozzle. The bulb 114 is supported on the rear end of a rod 116 by a universal joint 115 and the rod enters a cylinder 117. The cylinder 117, the muff 113, the aft manifold 82, and other adjacent equipment are supported on one or more hollow streamlined struts 118 on the casing 18. Flexible control elements in the form of chains or cables 120, or the equivalent, extend through the struts 118, are guided over sprockets 121 and are secured to the interior of the hollow or tubular bulb 114 at angularly spaced points. The tubular bulb 114 has a rearwardly convergent nozzle opening 122 which discharges a reactive stream or jet of air under pressure. By differentially operating the cables 120, the nozzle bulb 114 can be moved through a conical angle of 70° or more so that this jet of compressed air may be utilized to obtain a trimming action or pitch or turn control. It should be observed that the substantially spherical bulb 114 is free to move angularly in the main propulsive nozzle 24 also when the bulb is in its closed position essentially seated in the mouth of the main nozzle.

The nozzle bulb 114 is pressure balanced to facilitate its ready operation without involving heavy tension in control connections thereto. The pressure balancing means includes the above mentioned cylinder 117 and a piston 124 on the rod 116 for operating in the cylinder. A vent line 123 maintains the forward end of the cylinder 117 in communication with the atmosphere. A pressure line 125 communicates with the aft end of the cylinder 117 and extends to a convenient source of air pressure so as to impose super atmospheric pressure on the aft side of the piston 123 and thus bias the nozzle bulb 114 toward its open position. This facilitates movement of the bulb 114 from the closed position to the open position. In practice, the line 125 may have its outer end open to the plenum chamber 20 or other region of relatively cool fluid under pressure. Since flow conditions in the nozzle 24 tend to urge the bulb 114 to the closed position, there is no necessity to bias the bulb toward the closed position. An air scoop or blast tube 126 is associated with the pressure balancing means just described to direct relatively cool plenum chamber air against the nozzle bulb actuating and balancing mechanisms. The tube 126 discharges inwardly and rearwardly against the cylinder 117, the chains 120, the sprockets 121, etc. to prevent this equipment from becoming excessively hot.

The gas flow at the nozzles 30 will total about 26 lbs. per second, producing a jet velocity of about 2300 ft. per second inasmuch as the gases discharge into a depressed region of the jet pump tube because the flow velocity of entrained air at the throat of the jet pump tube is approximately sonic, or 1000 ft. per second. This, in turn, will produce a jet net thrust of about 1700 lbs. with the temperature at 1520° F. Assuming the efficiency of the jet pump to be 40% the conditions in the vertical lift tube will be substantially as follows:

Total gas and air flow 115 lbs. per second, a jet discharge velocity of 635 ft. per second, a stream temperature of 400° F. and a thrust output of 2,280 lbs. The recompression ratio between the throat and exit of the jet pump amounts to about 1.9 to 1.

Since the inducted air flow is in the ratio or amount of 3.5 times the jet nozzle flow the jet pump effects over 33% increase in lift. The bulb 114 of the rear propulsive nozzle 24 may be directed at an angle of 60° to the ground with the bulb in the closed position. The jet opening 122 of the bulb 114, directed in this manner, discharges 10% of the ducted compressor air flow at the same velocity and temperature as the rear main propulsive nozzle to add 100 lbs. upward thrust, providing a total lifting force of 2,380 lbs.

The jet pump tube 15 is provided with one or more valves 128 adapted to close or be closed during translational flight and capable of being set or directed for banking control during vertical flight. I have shown two companion valves 128 of airfoil or streamlined cross section carried by or fixed to fore and aft shafts 130. The valves 128 are preferably unbalanced, that is their axes of pivotal movement are unequally spaced between their fore and aft or upper and lower edges so as to automatically open when the air and gas flows downwardly through the jet tube 15 and to automatically close during translational flight of the vehicle. A releasable or normally free control system is provided to direct the valves 128 for the purpose of banking control or trimming during vertical or substantially vertical flight. This control includes crossed cables 160 operatively connected at one end with the valves 128. The cables 160 have their other ends connected with lever horns 161 on a mono manual lever 144.

The butterfly valves 31 of the jet pump nozzles 30 and the bulb 114 of the main propulsive nozzle 24 are preferably interconnected for simultaneous control or operation. I have shown a suitable mechanical linkage 143 between the shafts 32 of the butterfly valves and the chains 120 of the nozzle. This linkage is operable by the manual lever 144 between a position where the bulb 114 is forward or open and the valves 31 are closed, and a second position where the bulb 114 is closed and the valves 31 are open. The operative connection between the valve shafts 32 and the nozzle bulb 114 includes levers 162 on the valve shafts and a cable 163 connected with the levers and extending to a piston 164 operating in a cylinder 165. The above described cables or chains 120 connected with the interior of the nozzle bulb 114 operate over pulleys 166 on three equally spaced lever horns 161 on the manual control lever 144, and also have their ends connected with the piston 164. Air pressure lines 167 supply operating pressure to the opposite ends of the cylinder 165. A manual valve 168, preferably of the push-button type, is operable to charge one end of the cylinder 165 with air pressure to simultaneously pull the three cables 120 and thus move the nozzle bulb 114 to the "open" position. The cable 163 is pulled simultaneously with the cables 120 to close the jet tube valves 32. This conditions the powerplant for level flight operations. Air pressure supplied to the opposite ends of the cylinder 165 relaxes tension on the cables 120 and the bulb 114 moves to the closed position in the nozzle by air flow there through and tension on the cable 163 is simultaneously relaxed so that pressure from the plenum chamber moves the valves 31 to their open positions. This conditions the propulsive system for vertical or substantially vertical flight operations.

If desired, the above described unbalanced valves 128, adjacent the exit of the jet pump tube 15, may have semi-circular cut-outs or openings 145 opposite one or more of the jet nozzles of the plenum tube being left open; to discharge a limited stream of ducted compressor air for boundary layer air extraction from the airplane's upper surface during level or translational flight when all other valves associated with the jet tube are closed, it being understood that these openings are optional and may be omitted if desired. It is obvious that the bell-mouth of the jet tube may optionally be faired to the external air stream, if desired, by sliding sheets of metal, or the equivalent.

Assuming the aircraft to be on a field or take-off station, it may be desired to operate the craft substantially vertically from the station. The propulsive system is conditioned for this action by simultaneously closing the nozzle bulb 114 and opening the jet pump nozzles 30 in the manner described above. The manual lever 144 is operated to set the nozzle bulb 114 in a suitable trim position or may be operated to move the bulb during vertical ascent, the lever 144 also being operable to set or adjust jet tube valves 128 for banking purposes. In this connection it should be noted that the 120° spacing of the horn levers 161 provides for this "differential" or directional control of the bulb 114 and valves 128. With the jet pump tube 15 open and the jet pump nozzles 30 discharging downwardly into the tube, the air and combustion gases jetted from the nozzles mix with inducted outside air entering through the bell-mouth 14 to create a strong negative pressure or suction at the top of the fuselage 10. This negative pressure is increased by the immediately adjacent air inlet 22 of the plenum chamber 20, augmenting the vertical lift effect of the jet pump. With the jet pump in operation substantially 90% of the ducted compressor air flow is directed through the spaced jet pump nozzles 30 to produce a highly efficient jet pump action. Under a typical vertical ascent condition the gas flow through these nozzles will be about 26 pounds per second at a velocity of 2300 feet per second, producing a jet net thrust of 1700 pounds. Assuming the efficiency of the jet pump to be approximately 40%, the total gas and air flow through the vertical jet lift tube 15 will be 115 pounds per second at an outlet jetting velocity of 635 feet per second, producing a thrust of 2,380 pounds. It should be noted that the valves 31 in the jet pump nozzles form throats and the mixed air and combustion gas jets become supersonic as they pass the valve throat restriction and approach the depression at the throat of the jet pump tube. The plurality of relatively small jet nozzles bring about an increased mixing shear area in the jet pump tube, allowing the tube to be made relatively short with proportionately less wall friction loss and with a more uniform outlet condition.

When sufficient altitude has been obtained the propulsion system may be readily conditioned for translational flight by moving the lever 144 to simultaneously open the propulsive nozzle bulb 114 and to close the jet pump nozzles 30. With the jet pump tube 15 closed, the entire mass flow of air flows aft through the plenum chamber, to discharge from the nozzle 24 as a propulsive jet.

For vertical or substantially vertical descent, the powerplant system is conditioned as above described for the vertical ascent so that the jet pump tube 15 acts to provide a substantial vertical lift augmented or assisted by the negative pressure condition in the bell-mouth region.

Having described only typical forms of the invention I do not wish to be limited to the specific details herein set forth, but wish to reserve to myself any variations or modifications that may appear to those skilled in the art and fall within the scope of the following claims.

I claim:

1. In an aircraft having a body the combination of; a plenum chamber extending fore and aft of the upper side of the aircraft body, a jet pump tube extending from the upper side of the body beneath said plenum chamber to the underside of the body, jet pump nozzle means discharging from the chamber downwardly into the tube, a propulsive nozzle at the aft end of the chamber, means creating a flow through the chamber, and means controlling flow through said jet nozzle means and said propulsive nozzle whereby said flow may be discharged either from said jet nozzle means to produce a jet pump effect through said tube or a propulsive discharge jet through said propulsive nozzle.

2. In an aircraft having a body the combination of; a fore and aft channel in the upper side of the body, a jet pump tube extending downwardly from the channel to the under side of the body, powerplant means in the channel comprising an elongate casing, and means in the casing producing an aft directed stream of propulsive fluid, a propulsive nozzle at the aft end of the casing discharging said stream in the form of a propulsive jet, means for substantially closing the propulsive nozzle, jet pump nozzles extending laterally from said casing for discharging said propulsive fluid downwardly into said tube when said propulsive nozzle is substantially closed, and means for closing the jet pump nozzles when the propulsive nozzle is open.

3. In an aircraft having a body the combination of; a fore and aft channel in the upper side of the body, a jet pump tube extending downwardly from the channel to the under side of the body, powerplant means in the channel comprising an elongate casing, a flaring upwardly facing bell-mouth entrance for the upper end of said tube where it joins the powerplant means in the channel, means in the casing producing an aft directed stream of propulsive fluid, a propulsive nozzle at the aft end of the casing discharging said stream in the form of a propulsive jet, means for substantially closing the propulsive nozzle, jet pump nozzles extending laterally from said casing for discharging said propulsive fluid into said tube when said propulsive nozzle is substantially closed, and means for closing the jet pump nozzles when the propulsive said nozzle is open.

4. In an aircraft having a body the combination of; a fore and aft channel in the upper side of the body, a jet pump tube extending downwardly from the channel to the under side of the body, powerplant means in the channel comprising an elongate casing, and means in the casing producing an aft directed stream of propulsive fluid, a propulsive nozzle at the aft end of the casing discharging said stream in the form of a propulsive jet, means for substantially closing the propulsive nozzle, jet pump nozzles extending laterally from said casing for discharging said propulsive fluid downwardly into said tube when said propulsive nozzle is substantially closed, valve means for closing the jet pump nozzles, and means operable to open the valve means and to actuate the propulsive nozzle closing means to substantially close said propulsive nozzle so that said stream discharging through the jet pump nozzles creates a jet pump action to produce a vertical lift, said valve operating means further operable to close the valve means and to actuate the propulsive nozzle closing means to open said propulsive nozzle so that said stream discharges from the propulsive nozzle to produce a forward thrust.

5. In an aircraft the combination of; a fuselage having a duct extending vertically therethrough, a bell-mouth atmospheric air entrance to the duct, and a powerplant including a casing carried by the fuselage to bridge the bell-mouth, means in the casing producing a stream of propulsive air, and at least one jet nozzle on the casing discharging said stream through the bell-mouth into the duct.

6. In an aircraft the combination of; a fuselage having a duct extending vertically therethrough, a bell-mouth atmospheric air entrance to the duct, a powerplant including a casing extending substantially transversely across the bell-mouth, the casing having an air inlet in the bell-mouth, said casing having a propulsive nozzle directed transversely of the duct and having a jet nozzle directed into the duct from the bell-mouth, and means producing propulsive airflow through the casing for discharge from said nozzles.

7. In an aircraft the combination of; a fuselage having a duct extending therethrough in one direction and a bell-mouth atmospheric air entrance to the duct, a surface channel extending from the bell-mouth in a direction generally transversely of the duct, a powerplant in the channel having an air inlet in the bell-mouth and including jet pump nozzle means discharging into the duct, and means producing a propulsive fluid flow for discharge from the nozzle means.

References Cited in the file of this patent

UNITED STATES PATENTS

| | | |
|---|---|---|
| 1,362,997 | Koleroff | Dec. 21, 1920 |
| 1,375,601 | Morize | Apr. 19, 1921 |
| 1,493,753 | Koleroff | May 13, 1924 |
| 1,585,281 | Craddock | May 18, 1926 |
| 2,444,318 | Warner | June 29, 1948 |
| 2,730,311 | Doak | Jan. 10, 1956 |
| 2,922,277 | Bertin | Jan. 26, 1960 |

FOREIGN PATENTS

| | | |
|---|---|---|
| 903,462 | France | Jan. 15, 1945 |
| 149,139 | Australia | Nov. 24, 1952 |